US 8,048,958 B2

(12) United States Patent
Hirau et al.

(10) Patent No.: US 8,048,958 B2
(45) Date of Patent: Nov. 1, 2011

(54) GOLF BALL

(75) Inventors: Tsutomu Hirau, Kobe (JP); Toshiyuki Tarao, Kobe (JP)

(73) Assignee: SRI Sports Limited, Kobe (JP)

( * ) Notice: Subject to any disclaimer, the term of this patent is extended or adjusted under 35 U.S.C. 154(b) by 475 days.

(21) Appl. No.: 12/289,955

(22) Filed: Nov. 7, 2008

(65) Prior Publication Data
US 2009/0124429 A1 May 14, 2009

(30) Foreign Application Priority Data

Nov. 8, 2007 (JP) ................................. 2007-291263

(51) Int. Cl.
A63B 37/12 (2006.01)
A63B 37/00 (2006.01)
C08L 75/00 (2006.01)

(52) U.S. Cl. ... 525/129; 525/127; 525/130; 525/440.01; 525/440.11; 525/440.12; 525/440.15; 525/457; 473/378

(58) Field of Classification Search .......................... None
See application file for complete search history.

(56) References Cited

U.S. PATENT DOCUMENTS

| 3,395,109 A | 7/1968 | Molitor et al. |
| 3,989,568 A | 11/1976 | Isaac |
| 4,123,061 A | 10/1978 | Dusbiber |
| 4,248,432 A | 2/1981 | Hewitt et al. |
| 4,347,338 A * | 8/1982 | Torii et al. ...................... 525/123 |
| 5,334,673 A | 8/1994 | Wu |
| 6,123,628 A | 9/2000 | Ichikawa et al. |
| 6,747,100 B2 | 6/2004 | Ichikawa et al. |
| 6,764,415 B2 | 7/2004 | Ichikawa et al. |
| 6,806,323 B2 | 10/2004 | Ichikawa et al. |
| 6,992,145 B2 * | 1/2006 | Ichikawa et al. ........... 525/330.1 |
| 7,090,799 B2 | 8/2006 | Takesue et al. |
| 2007/0129174 A1 * | 6/2007 | Higuchi ........................ 473/373 |

FOREIGN PATENT DOCUMENTS

| JP | 51-74726 | 6/1976 |
| JP | 2662909 B2 | 6/1997 |
| JP | 11-178949 A | 7/1999 |
| JP | 2002-336378 A | 11/2002 |
| JP | 2002-336380 A | 11/2002 |
| JP | 2002-336386 A | 11/2002 |
| JP | 2005-253962 A | 9/2005 |

* cited by examiner

*Primary Examiner* — David Buttner
(74) *Attorney, Agent, or Firm* — Birch, Stewart, Kolasch and Birch LLP

(57) ABSTRACT

An object of the present invention is to provide a golf ball comprising a core and a cover, wherein the cover is made from a cover composition containing, as a resin component,
  a thermoplastic polyurethane (A) and
  a polyisocyanate mixture (B) in which a polyisocyanate (b-1) having at least three isocyanate groups is dispersed in a thermoplastic resin (b-2) which does not substantially react with an isocyanate group; and wherein the cover composition has a slab hardness of more than 60 and not more than 75 in Shore D hardness, and the cover has the thickness of 2.5 mm or less.

18 Claims, 3 Drawing Sheets

GOLF BALL

FIELD OF THE INVENTION

The present invention relates to a golf ball, more particularly to a golf ball excellent in abrasion-resistance, durability and flight performance.

DESCRIPTION OF THE RELATED ART

As a base resin constituting a cover of a golf ball, an ionomer resin or polyurethane is used. Covers containing ionomer resins are widely used for their excellent resilience, durability, workability and the like. However, because of their high rigidity and hardness, problems such as bad shot feeling, inadequate spin performance and poor controllability are pointed out. On the other hand, the polyurethane is used as a base resin constituting the cover since it provides an improved shot feeling and spin properties compared with an ionomer resin. For example, Japanese patent publication No. S51-74726, Japanese patent No. 2662909 and U.S. Pat. No. 4,123,061 disclose a use of thermosetting polyurethane for a cover, and U.S. Pat. Nos. 3,395,109 and 4,248,432 disclose a use of thermoplastic polyurethane for a cover. Although a golf ball having excellent abrasion-resistance can be obtained when the thermosetting polyurethane is used for a cover, a process of preparing a golf ball will be complicated. Additionally, a golf ball using the thermoplastic polyurethane for a cover is insufficient in abrasion-resistance and durability compared with the golf ball using the thermosetting polyurethane.

Examples of a technology for improving a cover using the thermoplastic polyurethane include Japanese patent publication Nos. H11-178949, 2002-336378, 2002-336380, 2002-336386, and 2005-253962. Japanese patent publication No. H11-178949 discloses a solid golf ball comprising a solid core and a cover covering the solid core, wherein a resin component forming the cover comprises a reaction product of a thermoplastic polyurethane elastomer and blocked isocyanate as a main component. Additionally, Japanese patent publication Nos. 2002-336378, 2002-336380 and 2002-336386 disclose golf balls having a cover made from a composition containing a thermoplastic polyurethane material and an isocyanate mixture in which an isocyanate compound having two or more functional groups in a molecule is dispersed in a thermoplastic resin which does not substantially react with an isocyanate.

Japanese patent publication No. 2005-253962 discloses a golf ball having a cover comprising, as a main component, a mixture of a thermoplastic resin composition, an isocyanate compound or an isocyanate mixture having two or more isocyanate groups in a molecule as functional groups and a thermoplastic polyurethane elastomer, wherein the thermoplastic resin composition is selected from the group consisting of a thermoplastic block copolymer, a polyester elastomer, a polyamide elastomer, and polyolefin, and is modified with a functional group having reactivity with an isocyanate.

However, Japanese patent publication Nos. H11-178949, 2002-336378, 2002-336380, 2002-336386, and 2005-253962 merely disclose bifunctional isocyanate compounds having a low-molecular weight which are relatively soft substances. In the technology using the polyisocyanate mixture in which the bifunctional isocyanate compound is dispersed in a thermoplastic resin, the crosslinking density of the resultant cover is low so that abrasion-resistance is not always sufficient. Additionally, there has been a problem in that if an amount of the polyisocyanate mixture is increased in order to enhance crosslinking density of the resultant cover, the abrasion-resistance of the cover adversely becomes lower due to an accompanying increase of a content of a thermoplastic component which is poor in abrasion-resistance.

SUMMARY OF THE INVENTION

The present invention has been achieved in view of the above circumstances. An object of the present invention is to provide a golf ball which has a urethane cover with high hardness and which is excellent in abrasion-resistance, durability and a flight performance.

The present invention, which has solved the above problem, provides a golf ball comprising a core and a cover covering the core, wherein the cover is made from a cover composition containing, as a resin component, a thermoplastic polyurethane (A) and
a polyisocyanate mixture (B) in which a polyisocyanate (b-1) having at least three isocyanate groups is dispersed in a thermoplastic resin (b-2) which does not substantially react with an isocyanate group; and
wherein the cover composition has a slab hardness of more than 60 and not more than 75 in Shore D hardness, and the cover has a thickness of 2.5 mm or less.

That is, in the present invention, the thermoplastic polyurethane (A) is crosslinked by the polyisocyanate mixture (B) obtained by dispersing the polyisocyanate (b-1) having at least three isocyanate groups in the thermoplastic resin (b-2) which does not substantially react with an isocyanate group and the slab hardness of the cover composition is controlled so high as more than 60 and 75 or lower and the thickness of the cover is adjusted to be 2.5 mm or thinner. Accordingly, the crosslinking density of the cover to be obtained can efficiently be heightened and therefore, there is no need to add the polyisocyanate mixture (B) in an excess amount to the thermoplastic polyurethane (A) and thus a golf ball excellent in the abrasion resistance and durability can be obtained. Also, due to an increase in the hardness of the cover and enlargement of the core diameter, the repulsive performance of the golf ball is improved and a long flight distance can be achieved.

The polyisocyanate mixture (B) preferably has NCO content (NCO %) of 5.0 mass % to 30.0 mass %, and the polyisocyanate (b-1) preferably has NCO content (NCO %) of 1.5 mass % to 30.0 mass %.

The thermoplastic resin (b-2) which does not substantially react with an isocyanate group is preferably at least one kind selected from the group consisting of a polyester elastomer, an acrylic elastomer, a styrene elastomer, an olefin elastomer, and a vinyl chloride elastomer.

The cover composition preferably contains the polyisocyanate mixture (B) in an amount of 1 part to 50 parts by mass relative to 100 parts by mass of the thermoplastic polyurethane (A), and the polyisocyanate (b-1) and the thermoplastic resin (b-2) are preferably blended in the polyisocyanate mixture (B) (a total of 100 mass %) in a ratio of the polyisocyanate (b-1)/thermoplastic resin (b-2)=5 mass % to 50 mass %/50 mass % to 95 mass %.

According to the present invention, a golf ball excellent in abrasion resistance, durability, and also in flight performance can be provided.

DESCRIPTION OF THE PREFERRED EMBODIMENT

Figure 1:
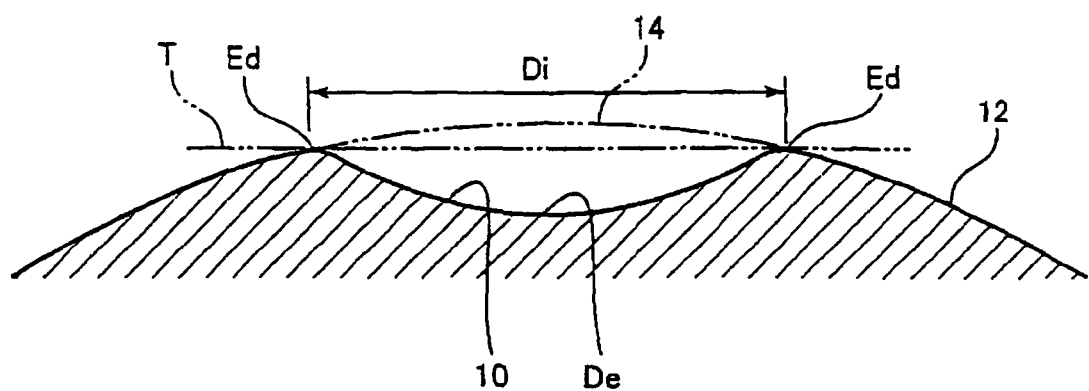
FIG. 1 is an expanded cross sectional view of a dimple formed on a golf ball surface.

The present invention provides a golf ball comprising a core and a cover covering the core, wherein the cover is made from a cover composition containing, as a resin component,
  a thermoplastic polyurethane (A) and
  a polyisocyanate mixture (B) in which a polyisocyanate (b-1) having at least three isocyanate groups is dispersed in a thermoplastic resin (b-2) which does not substantially react with an isocyanate group; and wherein the cover composition has a slab hardness of more than 60 and not more than 75 in Shore D hardness, and the cover has a thickness of 2.5 mm or less. Hereinafter, the present invention will be explained in detail.

First, the thermoplastic polyurethane (A) will be explained. The thermoplastic polyurethane (A) used in the present invention is not particularly limited, as long as it has a plurality of urethane bonds in a molecule and exhibits thermoplasticity. For example, the thermoplastic polyurethane is a reaction product obtained by reacting a polyisocyanate with a polyol to form urethane bonds in a molecule thereof, where necessary, obtained by further carrying out a chain extension reaction with a polyol, a polyamine or the like having a low-molecular weight.

The polyisocyanate component, which constitutes the thermoplastic polyurethane (A) is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane (A). A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane (A), a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyol component constituting the thermoplastic polyurethane (A) is not particularly limited as long as it has a plurality of hydroxyl groups, and such examples include a low-molecular weight polyol and a high-molecular weight polyol. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol.

Examples of the high-molecular weight polyol include a polyether polyol such as polyoxyethylene glycol (PEG), polyoxypropylene glycol (PPG), and polyoxytetramethylene glycol; a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The high-molecular weight polyol, used as the polyol component, has a hydroxyl value of 150 mgKOH/g or less, more preferably 120 mgKOH/g or less, even more preferably 60 mgKOH/g or less. The hydroxyl value of the high molecular weight polyol can be measured for example, by an acetylation method according to JIS K1557-1.

The polyamine that constitutes the thermoplastic polyurethane where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The thermoplastic polyurethane (A) has no limitation on the constitutional embodiments thereof. Examples of the constitutional embodiments are the embodiment where the polyurethane consists of the polyisocyanate component and the high-molecular weight polyol component; the embodiment where the polyurethane consists of the polyisocyanate component, the high-molecular weight polyol component and the low-molecular weight polyol component; and the embodiment where the polyurethane consists of the polyisocyanate component, the high-molecular weight polyol component, the low-molecular weight polyol component, and the polyamine component; and the embodiment where the polyurethane consists of the polyisocyanate component, the high-molecular weight polyol component and the polyamine component.

The thermoplastic polyurethane (A) has a slab hardness of 55 or more, more preferably 60 or more, and has a slab hardness of 75 or less, more preferably 70 or less in Shore D hardness. If the slab hardness of the polyurethane (A) is too low, the flight distance of the golf ball may be lowered, due to the low repulsion of the resultant cover. On the other hand, if the slab hardness of the polyurethane (A) is too high, the abrasion resistance and the durability may be lowered. Specific examples of the thermoplastic polyurethane (A) include "Elastollan ET858D, ET864D, 1174D, HM76D."

Next, the polyisocyanate mixture (B) in which the polyisocyanate (b-1) having at least three isocyanate groups is dispersed in the thermoplastic resin (b-2) which does not substantially react with an isocyanate group will be explained.

Examples of the polyisocyanate (b-1) having at least three isocyanate groups include a trifunctional isocyanate such as polymeric MDI, triphenyl methane triisocyanate, tris(isocyanate phenyl)thiophosphate, lysin ester triisocyanate, 1,6,11-undecane triisocyanate, 1,8-diisocyanate-4-isocyanate methyloctane, 1,3,6-hexamethylene triisocyanate, and bicycloheptane triisocyanate; isocyanurate of diisocyanate such as hexamethylene diisocyanate (HDI) and hydrogenated xylylene diisocyanate ($H_6XDI$); an adduct obtained by reacting diisocyanate with a triol having a low-molecular weight such as trimethylol propane or glycerin (free diisocyanate are preferably removed from the adduct); an allophanate modified polyisocyanate; a biuret modified polyisocyanate, and the like. The allophanate modified polyisocyanate is, for example, a trifunctional polyisocyanate obtained by reacting diisocyanate with a diol having a low-molecular weight to form a urethane bond and further reacting the urethane bond with the diisocyanate, and the biuret modified polyisocyanate is, for example, a trifunctional polyisocyanate obtained by reacting a diisocyanate with a diamine having a low-molecular weight to form a urea bond and further reacting the urea bond with the diisocyanate.

The diisocyanate constituting the isocyanurate, the adduct, the biuret modified polyisocyanate or the allophanate modified polyisocyanate is not particularly limited, and includes 2,4-toluene diisocyanate, 2,6-tolylene diisocyanate, 4,4'-diphenylmethane diisocyanate (MDI), 1,5-naphthalene diisocyanate, 2,6-naphthalene diisocyanate, m-phenylene diisocyanate, p-phenylene diisocyanate, tetramethylene diisocyanate, 3,3'-dimethyl-4,4'-biphenylene diisocyanate, 3,3'-dimethoxy-4,4'-biphenylene diisocyanate, xylylene diisocyanate (XDI), tetramethylxylylenediisocyanate (TMXDI), 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), norbornene diisocyanate (NBDI), 4,4'-diisocyanate diphenyl ether, 1,3-diisocyanate methylcyclohexane, 1,4-diisocyanate methylcyclohexane, 1,4-diisocyanate cyclohexane, and the like.

Among them, an isocyanurate of diisocyanate is preferable as the polyisocyanate (b-1), and for example, an isocyanurate of isophorone diisocyanate, hexamethylene diisocyanate or hydrogenated xylylenediisocyanate is more preferable. The polyisocyanate (b-1) may be used alone or as a combination of two or more.

The polyisocyanate (b-1) preferably has NCO content (NCO %) of 1.5 mass % or more, more preferably 2.0 mass % or more, even more preferably 5.0 mass % or more, even more preferably 15.0 mass % or more, and preferably has NCO content (NCO %) of 30.0 mass % or less, more preferably 27.0 mass % or less, even more preferably 25.0 mass % or less. If the polyisocyanate (b-1) has too low NCO content, the effect of the improvement may be little and the abrasion-resistance may also become worse, while if the polyisocyanate (b-1) has too high NCO content, the viscosity of the cover composition may increase to excess, resulting in lowering the moldability. NCO content (NCO %) of the polyisocyanate (b-1) is defined as 100×[number of moles of the isocyanate group in the polyisocyanate (b-1)×42 (molecular weight of NCO)]/[total amount (g) of the polyisocyanate (b-1)].

The number average molecular weight of the polyisocyanate (b-1) is preferably, for example, 200 or more, more preferably 400 or more, even more preferably 500 or more, and preferably 2500 or less, more preferably 2000 or less, even more preferably 1500 or less, even more preferably 1200 or less. The molecular weight of the polyisocyanate (b-1) or the number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

When the polyisocyanate (b-1) having at least three isocyanate groups is synthesized, a compound having only one or two isocyanate groups may be synthesized at the same time as a byproduct. Thus, the polyisocyanate (b-1) may be used as a mixture of a compound having at least three isocyanate groups and a compound having only one or two isocyanate groups for a resin component of the golf ball of the invention. In such a case, a percentage of the polyisocyanate having three or more isocyanate groups is preferably 70 mass % or more, more preferably 80 mass % or more, even more preferably 90 mass % or more with respect to the total mixture. If the percentage of the polyisocyanate having at least three isocyanate groups is less than 70 mass % with respect to the total mixture, a sufficient crosslinking effect may not be obtained.

The thermoplastic resin (b-2) which does not substantially react with an isocyanate group is not particularly limited as long as it is substantially inactive with an isocyanate group (That is, the thermoplastic resin (b-2) does not substantially have an active hydrogen reactive with an isocyanate group), and such examples include a polystyrene resin, a polyvinylchloride resin, an acrylic resin, an ABS resin, an ester rubber, a polycarbonate resin, a polyester resin (preferably polyethylene terephthalate), polyolefin, polyacetal, a difluoride resin, a tetrafluoride resin, and an ionomer resin. Among them, as the thermoplastic resin (b-2), a thermoplastic elastomer having rubber elasticity is preferable. For example, it is preferred to use at least one kind selected from the group consisting of a polyester elastomer, an acrylic elastomer, a styrene elastomer, an olefin elastomer, and a vinyl chloride elastomer. Examples of the polyester elastomer include "HYTREL such as "HYTREL 3046", "HYTREL 3548" and "HYTREL 4047" manufactured by DU PONT-TORAY Co, and examples of the styrene elastomer include "Rabalon" manufactured by Mitsubishi Chemical Corporation.

In the polyisocyanate mixture, a blending ratio of the polyisocyanate (b-1) to the thermoplastic resin (b-2) (a total of 100 mass %) is preferably: the polyisocyanate (b-1)/thermoplastic resin (b-2)=5 mass % to 50 mass %/50 mass % to 95 mass %, more preferably 10 mass % to 50 mass %/50 mass % to 90 mass %, even more preferably 20 mass % to 45 mass %/55 mass % to 80 mass %. If the blending ratio of the polyisocyanate (b-1) is less than the 5 mass %, a desired cross-linking effect may not be obtained, while if the blending ratio of the polyisocyanate (b-1) is more than 50 mass %, the producing the polyisocyanate mixture (B) becomes difficult.

NCO content (NCO %) of the polyisocyanate mixture (B) is defined as 100×[number of moles of the isocyanate group in the polyisocyanate mixture (B)×42 (molecular weight of NCO)]/[total amount (g) of the polyisocyanate mixture (B)].

The polyisocyanate mixture (B) preferably has NCO content (NCO %) of 5.0 mass % or more, more preferably 7.0 mass % or more, even more preferably 8.5 mass % or more, and preferably has NCO content (NCO %) of 30.0 mass % or less, more preferably 20.0 mass % or less, even more preferably 12.0 mass % or less.

If the NCO content (NCO %) of the polyisocyanate mixture (B) is lower than the above range, the effect of the abrasion-resistance may not be obtained due to the small degree of the crosslinking, while if the NCO content (NCO %) is more than the above range, the moldability may be lowered, because of the high viscosity of the cover composition.

The total content of the thermoplastic polyurethane (A) and the polyisocyanate mixture (B) in which the polyisocyanate (b-1) having at least three isocyanate groups is dispersed in the thermoplastic resin (b-2) which does not substantially react with the isocyanate group contained in the resin component constituting the cover composition used in the present invention, is preferably 50 mass % or more, more preferably 60 mass % or more, even more preferably 70 mass % or more. It is also a preferred embodiment that the cover composition used in the present invention, as the resin component, consists of the thermoplastic polyurethane (A) and the polyisocyanate mixture (B) obtained by dispersing the polyisocyanate (b-1) having at least three isocyanate groups in the thermoplastic resin (b-2) which does not substantially react with an isocyanate group.

In the present invention, as the resin component of the cover composition, other resin components can be used to the extent that the effects of the present invention are not damaged. Other resin components include, for example, an ionomer resin and a thermoplastic elastomer. Examples of the ionomer resin include one prepared by neutralizing at least a part of carboxyl groups in a copolymer composed of ethylene and α,β-unsaturated carboxylic acid having 3 to 8 carbon atoms with a metal ion, one prepared by neutralizing at least a part of carboxyl groups in a ternary copolymer composed of ethylene, α,β-unsaturated carboxylic acid having 3 to 8 carbon atoms, and α,β-unsaturated carboxylic acid ester with a metal ion, or a mixture thereof. The specific examples of the ionomer resin include "Himilan available from MITSUI-DUPONT POLYCHEMICAL, "Surlyn" available from DUPONT CO., and "Iotek" available from ExxonMobil Corp. The specific examples of the thermoplastic elastomer include a thermoplastic polyamide elastomer having a commercial name of "PEBAX", for example, "PEBAX 2533" available from ARKEMA Inc, a thermoplastic polyester elastomer having a commercial name of "HYTREL", for example, "HYTREL 3548", and "HYTREL 4047" available from DU PONT-TORAY Co., and a thermoplastic polystyrene elastomer having a commercial name of "Rabalon" available from Mitsubishi Chemical Co.

The cover composition used in the present invention may contain, other than the above-mentioned resin component, a pigment component such as titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the thermoplastic polyurethane (A) constituting the cover. The white pigment in an amount of 0.5 part by mass or more can impart opacity to the cover, while the white pigment in an amount of more than 10 parts by mass may lower the durability of the resulting cover.

The cover composition of the present invention has a slab hardness of more than 60, more preferably 62 or more, even more preferably 63 or more, and has a slab hardness of 75 or less, more preferably 72 or less, even more preferably 70 or less in Shore D hardness. If the slab hardness of the cover composition is 60 or less, the repulsion (flight distance) of the golf ball may be lowered. On the other hand, if the slab hardness is more than 75, the abrasion resistance and the durability of the formed cover may be lowered. Herein, the slab hardness of the cover composition means the hardness when measuring the hardness of the cover composition which is formed into a sheet, and the measuring method is described later.

In the method for preparing the golf ball of the present invention, the thermoplastic polyurethane (A) and the polyisocyanate mixture (B) in which the polyisocyanate (b-1) is dispersed in the thermoplastic resin (b-2) which does not substantially react with the isocyanate group are blended to obtain a cover composition. The blending of the cover composition is preferably carried out using, for example, a mixer capable of blending a raw material in the form of pellet, more preferably a tumbler type mixer. An embodiment of blending the cover composition include, for example, an embodiment of mixing an additive for the cover such as titanium oxide with the thermoplastic polyurethane (A) and subjecting the resultant mixture to extrusion to prepare a white pellet in advance, and then dry-blending the white pellet and the pellet of the polyisocyanate mixture (B); an embodiment of mixing the thermoplastic polyurethane (A), the polyisocyanate mixture (B) and the additive for a cover such as titanium oxide, and subjecting the resultant mixture to extrusion to prepare a white pellet in advance; and an embodiment of mixing the polyisocyanate mixture (B) and the additive for a cover such as titanium oxide and subjecting the resultant mixture to extrusion to prepare a white pellet in advance, and dry-blending the white pellet and a pellet of the thermoplastic polyurethane (A).

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case that the cover composition is subjected to direct injection molding onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed. The crosslinking can be further proceeded by post-curing the golf ball having the molded cover at the temperature of 40° C. or more for 4 to 96 hours.

In the present invention, use of the thermoplastic polyurethane (A) and the polyisocyanate mixture (B) suppresses the crosslinking reaction when molding the cover, and promotes the crosslinking reaction after molding the cover, thereby improving the abrasion-resistance of the cover without scarifying the productivity of the golf ball. The crosslinking of the cover can be confirmed by the following method.

The thermoplastic polyurethane (A) crosslinked with the polyisocyanate mixture (B) is insoluble in the solvent in which the linear thermoplastic polyurethane (A) is soluble. The solvent in which the linear thermoplastic polyurethane (A) is soluble includes, for example, N,N-dimethylformamide (DMF), tetrahydrofuran (THF) or the like. Namely, the thermoplastic polyurethane without being crosslinked is readily soluble in the solvent, but the thermoplastic polyurethane crosslinked with the polyisocyanate mixture (B) is insoluble in the solvent. According to this difference, it is possible to confirm whether the thermoplastic polyurethane is crosslinked or not.

Further, the thermoplastic polyurethane (A) crosslinked with the polyisocyanate mixture (B) has an allophanate bond or a biuret bond formed. These bonds are weaker than the urethane bond or the urea bond which constitute the main molecular chain of the thermoplastic polyurethane. Accordingly, the allophanate bond or the biuret bond forming the crosslinking structure can be broken by a treatment with a DMF solution of n-butylamine or a heat treatment.

The DMF solution of n-butyl amine preferably has a concentration of 0.01 mol/l to 0.25 mol/l, more preferably 0.05 mole/l. The heat treatment is preferably conducted at the temperature of 130° C. to 150° C. for 2 to 4 hours.

In addition, it is possible to confirm what kind of the polyisocyanate mixture crosslinks the thermoplastic polyurethane, by analyzing the product which is treated with the DMF solution of n-butyl amine or treated with heat, using gel permeation chromatography (GPC), Fourier transform infrared spectrophotometer (FT-IR), nuclear magnetic resonance apparatus (NMR) or the like.

In the present invention, the golf ball preferably has the cover with a thickness of 2.5 mm or less, more preferably 2.0 mm or less, even more preferably 1.5 mm or less. If the thickness of the cover is 2.5 mm or less, the diameter of the core can be enlarged. Thus, the resilience of the golf ball will become higher and a total flying distance will become longer. The lower limit of the thickness of the cover is preferably, for example, but not limited to, 0.3 mm, more preferably 0.5 mm, even more preferably 1.0 mm. If the thickness is less than 0.3 mm, the durability of the golf ball may be lowered.

When molding a cover, the concaves called "dimple" are usually formed on the surface. FIG. 1 is an expanded sectional view of a part of a golf ball 2. This figure shows a cross-section which includes the deepest part De of a dimple 10 and the center of the golf ball 2. The up and down direction in FIG. 1 is the depth direction of the dimple 10. The depth direction is the direction from the gravity center of the area of the dimple 10 to the center of the golf ball 2. A chain double-dashed line 14 in FIG. 1 shows a virtual sphere. The surface of the virtual sphere 14 is the surface of the golf ball 2 in the case of assuming that there is no dimple 10. The dimple 10 is depressed in the virtual sphere 14. A land 12 corresponds to the virtual sphere 14.

Two headed arrow Di in FIG. 1 shows the diameter of the dimple 10. The diameter Di is the distance from one contact point Ed to another contact point Ed when a common tangent line T is drawn in both sides of the dimple 10. The contact points Ed are edges of the dimple 10. The edges Ed define the outline of the dimple 10. The diameter Di is preferably 2.0 mm or more and 6.0 mm or less. If the diameter Di is less than the above range, the dimple effect is hardly obtained and if the diameter Di exceeds 6.0 mm, the intrinsic property of the golf ball 2, that is, it is substantially spherical, is lost.

The volume of the dimple means the volume of the portion surrounded with the curved plane including the outline of the dimple 10 and the virtual sphere 14. The total volume of the dimples 10 is preferably 250 $mm^3$ or more and 400 $mm^3$ or less. If the total volume is less than 250 $mm^3$, a hopping trajectory may be provided in some cases. If the total volume exceeds 400 $mm^3$, a dropping trajectory may possibly be provided.

In FIG. 1, the distance between the tangent line T and the deepest point De is the depth of the dimple 10. The depth is preferably 0.05 mm or more and 0.60 mm or less. If the depth is less than 0.05 mm, a hopping trajectory may be provided in some cases. On the other hand, if the depth exceeds 0.60 mm, a dropping trajectory may possibly be provided. The total number of the dimples 10 is preferably 200 or more and 500 or less. If the total number is less than 200, the dimple effect is hardly obtained. On the other hand, if the total number exceeds 500, the dimple effect is hardly obtained because the size of the respective dimples 10 is small.

After the cover is molded, the mold is opened and the golf ball body is taken out from the mold, and as necessary, the golf ball body is preferably subjected to surface treatment such as deburring, cleaning, and sandblast. If desired, a paint film or a mark may be formed. The thickness of the paint film is not limited, but is preferably 5 μm or more, more preferably 7 μm or more, and is preferably 25 μm or less, more preferably 18 μm or less. If the thickness is less than 5 μm, the paint film tends to be worn out due to the continuous use, while if the thickness is more than 25 μm, the effect of the dimple is diminished and thus the flight performance of the golf ball is lowered.

Next, a preferred embodiment of the core of the golf ball of the present invention will be explained.

The core of the golf ball of the present invention includes a single-layered core, a core consisting of a center and a single-layered intermediate layer covering the core, a core consisting of a center and multi-layered of intermediate layers covering the center, or a core consisting of a center and multi-piece of intermediate layers. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "rubber composition for the core" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber. Examples of the diphenyl disulfide or the derivative thereof include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis (2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained.

The amount of the antioxidant to be blended is preferably 0.1 part or more and is preferably 1 part or less based on 100 parts of the base rubber by mass. Further, the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C. When forming a core having a difference in the hardness between the surface hardness Hs and the center hardness Ho, it is preferable to heat for 10 to 60 minutes at the temperature of 130 to 200° C.

The diameter of the core of the golf ball of the present invention is preferably 36.7 mm or more, more preferably 37.7 mm or more, even more preferably 38.7 mm or more. If the diameter of the core is less than 36.7 mm, the thickness of the cover becomes too thick, so that the resilience is lowered. The upper limit of the diameter of the core is not particularly limited, but it is preferably 42.1 mm, more preferably 41.7 mm, even more preferably 40.7 mm. If the diameter of the core is more than 42.1 mm, the cover becomes relatively too thin, so that the protection effects of the cover cannot be sufficiently obtained.

It is a preferred embodiment that the core having a surface hardness Hs larger than the center hardness Ho is used. The difference between the surface hardness Hs and the center hardness Ho of the core used for the golf ball of the present invention is preferably 20 or more, more preferably 25 or more in Shore D hardness. By making the core have the surface hardness Hs larger than the center hardness Ho, a launch angle is increased and an amount of spin is lowered, so that flying distance is improved. The upper limit of the difference between the surface hardness Hs and the center hardness Ho of the core is not limited, but preferably 40, more preferably 35 in Shore D hardness. If the difference of the hardness is too large, the durability tends to be lowered.

The center hardness Ho of the core is preferably 30 or more, more preferably 32 or more, even more preferably 35 or more in Shore D hardness. If the center hardness Ho of the core is less than 30 in Shore D hardness, the golf ball tends to become so soft that the resilience will be lowered. On the other hand, the center hardness Ho of the core is preferably 50 or less, more preferably 48 or less, even more preferably 45 or less in shore D hardness. If the center hardness Ho is more than 50 in Shore D hardness, the golf ball becomes so hard that the shot feeling may be lowered. In the present invention, the center hardness Ho of the core means the hardness obtained by measuring the central point of the cut surface of the core cut into halves with the Shore D type spring hardness tester.

The surface hardness Hs of the core is preferably 45 or more, more preferably 50 or more, even more preferably 55 or more in Shore D hardness. If the surface hardness Hs is less than 45 in Shore D hardness, the golf ball may become too soft, resulting in lowering of resilience. On the other hand, the surface hardness Hs of the core is preferably 65 or less, more preferably 62 or less, even more preferably 60 or less in Shore D hardness. If the surface hardness Hs is larger than 65 in Shore D hardness, the golf ball may become too hard, resulting in lowering of the shot feeling.

In the case that the core of the present invention has the structure which comprises a center and a single-layered intermediate layer covering the center, or the structure which comprises a center and multi-piece or multi-layered intermediate layers covering the center, the center preferably has a diameter of 10 mm or more, more preferably 15 mm or more, and preferably has a diameter of 41 mm or less, more preferably 35 mm or less. If the diameter of the center is less than 10 mm, the thickness of the intermediate layer or the cover layer should be made thicker than the desired thickness, as a result, the repulsion may be lowered. On the other hand, if the diameter of the center is more than 41 mm, the thickness of the intermediate layer or the cover layer should be made thinner than the desired thickness, the intermediate layer or the cover layer may not function sufficiently.

In the case that the center has a diameter of from 10 mm to 41 mm, a compression deformation amount (deformation amount along the shrinkage direction) of the center when applying a load from 98 N as an initial load to 1275 N as a final load is preferably 2.0 mm or more, more preferably 2.50 mm or more, and preferably 7.0 mm or less, even more preferably 6.0 mm or less. If the above deformation amount is less than 2.0 mm, the center becomes too hard, so that the shot feeling tends to be lowered. If the above deformation amount is larger than 7.0 mm, the repulsion may be lowered.

As the intermediate layer, for example, a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; a thermoplastic polystyrene elastomer having a commercial name of "Rabalon" available from Mitsubishi Chemical Co.; and a thermoplastic polyurethane elastomer having a commercial name of "ELASTOLLAN", for example, "ELASTOLLAN XNY97A" available from BASF Japan may be used in addition to the cured product of the rubber composition and the conventional ionomer resins. Examples of the ionomer resin include an ionomer resin prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms and $\alpha,\beta$-unsaturated carboxylic acid ester with a metal ion, or a mixture thereof.

Specific examples of the ionomer resins include, but not limited to, Himilan 1555(Na), Himilan 1557(Zn), Himilan 1605 (Na), Himilan 1706 (Zn), Himilan 1707 (Na), Himilan AM7311 (Mg), and examples of the ternary copolymer ionomer resin include Himilan 1856(Na) and Himilan 1855(Zn) available from MITSUI-DUPONT POLYCHEMICAL CO., LTD.

Further, ionomer resins available from DUPONT CO. include Surlyn 8945(Na), Surlyn 9945(Zn), Surlyn 8140(Na), Surlyn 8150(Na), Surlyn 9120(Zn), Surlyn 9150 (Zn), Surlyn 6910(Mg), Surlyn 6120(Mg), Surlyn 7930(Li), Surlyn 7940(Li), Surlyn AD8546(Li), and examples of the ternary copolymer ionomer resin include Surlyn 8120(Na), Surlyn 8320(Na), Surlyn 9320(Zn), and Surlyn 6320(Mg).

Ionomer resins such as Iotek 8000(Na), Iotek 8030(Na), Iotek 7010(Zn), and Iotek 7030(Zn) are available from Exxon Co. Examples of the ternary copolymer ionomer resin include Iotek 7510(Zn) and Iotek 7520(Zn). The ionomer resins exemplified above can be used alone, or as a mixture of two or more.

Na, Zn, K, Li, or Mg described in the parentheses after the commercial name of the ionomer resin represents a kind of metal used for neutralization.

The intermediate layer is formed, for example, by covering the center with the intermediate layer composition. An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding for 1 to 5 minutes at the temperature of 130° C. to 170° C.

The intermediate layer of the golf ball of the present invention preferably has a slab hardness of 45 or more, more preferably 47 or more, even more preferably 50 or more, and preferably has a slab hardness of 75 or less, more preferably 70 or less, even more preferably 68 or less, even more preferably 65 or less in Shore D hardness. By making the slab hardness of the intermediate layer 45 or more in Shore D hardness, the core can be designed to have a hard outer and soft inner structure. As a result, a long flight distance can be achieved by high launch angle and low spin rate. If the slab hardness of the intermediate layer is not more than 75 in Shore D hardness, the excellent shot feeling can be obtained. Further, the controllability can be enhanced by the improved spin rate. Herein, the slab hardness of the intermediate layer means a hardness when measuring the hardness of the intermediate layer composition which is formed into a sheet, and the measuring method is described later. In addition, the slab hardness of the intermediate layer can be appropriately adjusted by the selection of the above mentioned resin component or the rubber composition, and the amount of the additives.

A structure of the golf ball of the present invention, it may be a two-piece golf ball having a core and a cover covering the core; a three-piece golf ball having a core consisting of a center and a single intermediate layer covering the center, and the cover covering the core; a multi-piece golf ball having a core consisting of a center and multi-piece or multi-layered intermediate layers covering the center, and a cover covering the core. Among them, the present invention can be preferably applied to the two-piece golf ball having a core and a cover covering the core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation]
(1) Slab Hardness (Shore D Hardness)

Using the cover composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(2) Core Hardness (Shore D Hardness)

The shore D hardness measured at a surface part of a core using P1-type automatic rubber hardness tester equipped with the Shore D type spring hardness tester specified by ASTM-D2240 manufactured by Kobunshi Keiki Co., Ltd., was determined as the surface hardness Hs of the core, and the shore D hardness obtained by cutting a spherical core into halves and measuring at a center of the cut surface was determined as the center hardness Ho of the core.

(3) Flight Performance with a Driver Shot (Head Speed=45 m/s)

A W #1 driver with a metal head (manufactured by SRI Sports Ltd, XXIO, S shaft, loft 11°) was attached to a swing robot M/C manufactured by Golf Laboratories, Inc. and respective golf balls were hit at a head speed of 45 m/second to measure the speed (m/s) and spin rate (rpm) right after hitting, and the flight distance (distance (m) from the launching point to the stop point). The measurement was carried out 10 times for each golf ball and the average value was defined as the flight distance. The speed and the spin rate of the golf ball right after the hitting were measured by continuously taking pictures of the hit golf ball.

(4) Abrasion-Resistance

A commercially available sand wedge was installed on a swing robot available from Golf Laboratories, Inc., and two points of a ball respectively were hit once at the head speed of 36 m/sec. to observe the areas which were hit. Abrasion-resistance was evaluated and ranked into four levels based on following criteria.

E (Excellent): Almost no scratch was present on the surface of the golf ball.

G (Good): Slight scratches were present on the surface of the golf ball, but were not conspicuous.

F (Fair): Scratches were conspicuous, and scuffing could be observed.

P (Poor): The surface of the golf ball was abraded considerably, and scuffing was conspicuous.

(5) Durability

Each golf ball was repeatedly hit with a metal head driver (manufactured by SRI Sports Ltd, XXIO, S shaft, loft 11°) attached to a swing robot M/C manufactured by Golf Laboratories, at the head speed of 45 m/sec. to make the golf ball collide with a collision board. Times up to which the golf balls are cracked were measured. In addition, each value obtained was reduced to an index number relative to the measured value obtained in Golf ball No. 7 being assumed 100. The larger number indicates better durability.

[Preparation of Polyisocyanate Mixture (B)]

As the thermoplastic resin which does not substantially react with an isocyanate group, one obtained by drying to dehydrate in advance a thermoplastic polyester elastomer ("HYTREL 3046" manufactured by DU PONT-TORAY Co,) (b-2) was prepared. The polyisocyanate (b-1) and the thermoplastic polyester elastomer (b-2) shown in Table 1 were blended in a proportion of 1:3 by mass ratio, and were kneaded in a mixing roll at the temperature of from 120° C. to 180° C. for 5 to 10 minutes. The resultant mixture was taken out and pulverized, thereby obtaining a pellet of the polyisocyanate mixture (B).

TABLE 1

| Raw Material | | Average molecular weight | Polyisocyanate mixture (B) 1 | 2 | 3 |
|---|---|---|---|---|---|
| Polyisocyanate | MDI | 250 | 250 | — | — |
| Trifunctional polyisocyanate (b-1) | TAKENATE D-170N | 504.6 | — | 504.6 | — |
| | TAKENATE D-127N | 666.9 | — | — | 666.9*) |
| Thermoplastic polyester(b-2) | HYTREL 3046 | — | 750 | 750 | 750 |
| NCO content (NCO %) of Polyisocyanate (b-1) | | | — | 25.0 | 18.9 |
| NCO content (NCO %) of Polyisocyanate mixture (B) | | | 8.4 | 10.0 | 8.9 |

Formulation: g
*)The amount of TAKENATE D-127N was 666.9 g based on the non-volatile components.
Notes on Table 1
MDI: 4,4'-diphenylmethane diisocyanate manufactured by Tokyo Chemical Industry Co., Ltd.
TAKENATE D-170N: HDI isocyanurate (trimer) manufactured by Mitsui Chemicals Polyurethanes, Inc.; MW = 504.6
TAKENATE D-127N: $H_6$XDI isocyanurate (trimer) manufactured by Mitsui Chemicals Polyurethanes, Inc.; MW = 666.9

[Preparation of Two-Piece Golf Ball]
(1) Preparation of Core
The rubber composition shown in Table 2 was kneaded and pressed with upper and lower molds each having a spherical cavity at the heating condition of 160° C. for 13 minutes to obtain the core in a spherical shape.

TABLE 2

| Core composition | | | |
|---|---|---|---|
| Formulation | Polybutadiene Rubber | | 100.0 |
| | Zinc acrylate | | 35.0 |
| | Zinc oxide | | 5.0 |
| | Dicumyl peroxide | | 0.9 |
| | Diphenyl disulfide | | 0.5 |
| | Barium sulfate | | Proper amount*) |
| Property | Central hardness Ho(Shore D) | | 35 |
| | Surface hardness Hs(Shore D) | | 55 |

Formulation: mass part
*)Adjusted to give golf ball weight of 45.4 g depending on the cover composition.
Notes on Table 2
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Barium sulfate: barium sulfate BD manufactured by Sakai Chemical Industry Co. Ltd.
Dicumyl peroxide: Percumyl D manufactured by NOF Corporation
Diphenyl disulfide: manufactured by Sumitomo Seika Chemicals Company Limited (2) Preparation of Cover Composition and Golf Ball Body
Thermoplastic polyurethane (A) in the form of a pellet, polyisocyanate mixture (B) in the form of a pellet, and an additive for cover (titanium oxide) shown in Table 4 were dry-blended using a tumbler type mixer to prepare a cover composition. The blending ratio of the polyisocyanate mixture (B) to the thermoplastic polyurethane (A) was adjusted to have an almost same NCO content with respect to 100 mass parts of the thermoplastic polyurethane (A).

(2-1) Injection-Molding
The resultant cover composition was injection-molded onto the core thus obtained to form the cover. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

(2-2) Compression-Molding
Molding of half shells were performed by charging a pellet of the cover composition thus obtained into each of the depressed part of the lower mold for molding half shells, and applying pressure to mold half shells. Compression molding was conducted at the temperature of 170° C. for 5 minutes under the molding pressure of 2.94 MPa. The core obtained above was covered with two half shells in a concentric manner and the cover was molded by compression molding. Compression molding was performed at the temperature of 150° C. for 2 minutes under the molding pressure of 9.8 MPa to obtain a golf ball body.

(3) The surface of the obtained golf ball body was subjected to sandblast treatment and marking followed by coating a clear paint, drying at the temperature of 40° C. for 4 hours in an oven to dry the paint to obtain a golf ball having a diameter of 42.7 mm.

Figure 2:
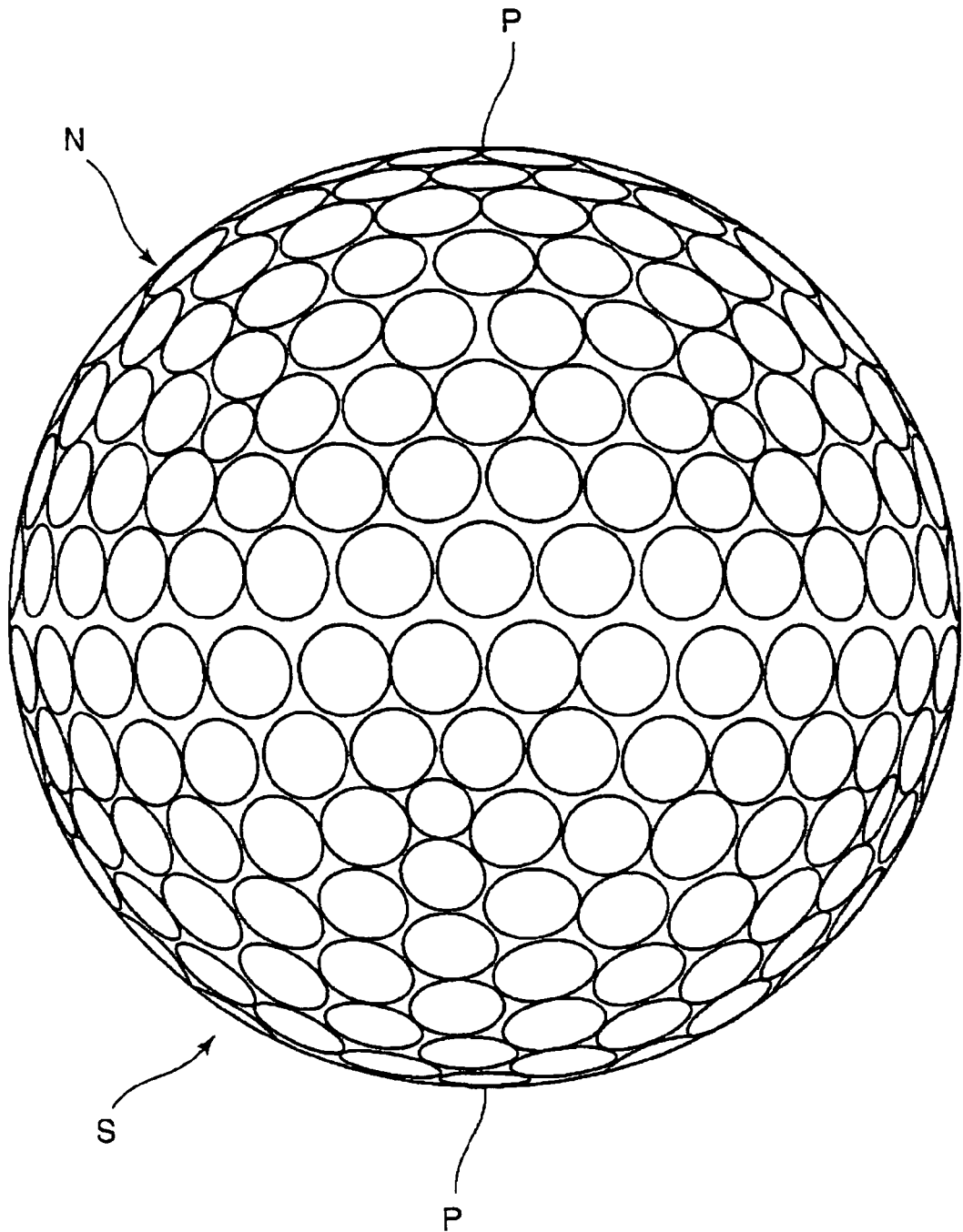
FIG. 2 is a front view of a dimple pattern formed on a golf ball surface.
Figure 3:
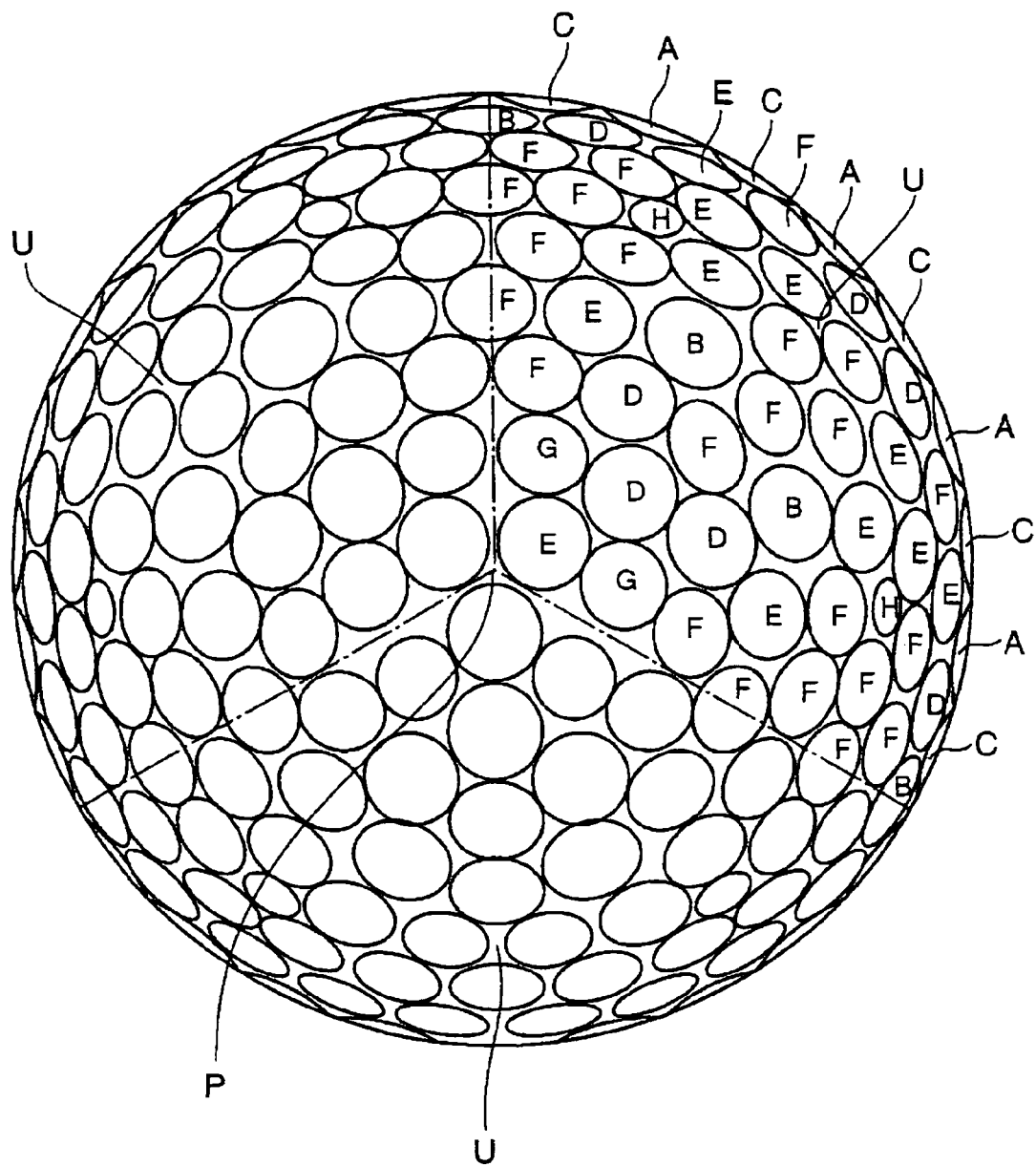
FIG. 3 is a plane view of a dimple pattern formed on a golf ball surface.

The dimple pattern shown in Table 3, FIG. 2 and FIG. 3 were formed on the surface of the golf ball. In the north hemisphere N and south hemisphere S of the golf ball (P means Pole in FIGS. 2 and 3), there is a unit U which has rotational symmetries through 120 degrees. In each of the north hemisphere and the south hemisphere, there are three units U. FIG. 3 shows kinds of dimples by represented symbols A to H in only one unit U.

TABLE 3

| Kinds | Number | Diameter (mm) | Depth (mm) | Curvature radius (mm) | Volume (mm³) |
|---|---|---|---|---|---|
| A | 24 | 4.75 | 0.140 | 20.22 | 1.242 |
| B | 18 | 4.65 | 0.140 | 19.38 | 1.190 |
| C | 30 | 4.55 | 0.135 | 19.24 | 1.099 |
| D | 42 | 4.45 | 0.135 | 18.40 | 1.051 |
| E | 66 | 4.25 | 0.135 | 16.79 | 0.959 |
| F | 126 | 4.05 | 0.130 | 15.84 | 0.839 |
| G | 12 | 3.95 | 0.130 | 15.07 | 0.798 |
| H | 12 | 2.80 | 0.120 | 8.23 | 0.370 |

The obtained golf ball was evaluated in terms of the initial ball speed, the spin rate, and the flight distance at the driver shot, as well as the abrasion-resistance and durability. The results are shown in Table 4.

TABLE 4

| | | Golf ball No. | | | | | | | |
|---|---|---|---|---|---|---|---|---|---|
| | | 1 | 2 | 3 | 4 | 5 | 6 | 7 | 8 |
| Structure | | 2P | 2P | 2P | 2P | 2P | 2P | 2P | 2P |
| Core | Diameter (mm) | 40.7 | 40.7 | 40.7 | 40.7 | 40.7 | 41.7 | 41.9 | 39.1 |
| Cover | Thermoplastic polyurethane (A) | — | — | — | — | — | — | — | — |
| | Elastollan ET858D | — | — | — | — | — | — | — | — |

TABLE 4-continued

| | | | | | | | | | |
|---|---|---|---|---|---|---|---|---|---|
| | Elastollan ET864D | 100 | 100 | 100 | 100 | — | 100 | 100 | 100 |
| | Elastollan 1174D | — | — | — | — | 100 | — | — | — |
| | Elastollan HM76D | — | — | — | — | — | — | — | — |
| | Polyisocyanate mixture (B) [NCO %] | | | | | | | | |
| | 1 [8.4] | — | — | — | — | — | — | — | — |
| | 2 [10.0] | 3 | 10 | — | — | 3 | 3 | 3 | 3 |
| | 3 [8.9] | — | — | 3 | 10 | — | — | — | — |
| | Titanium oxide | 4 | 4 | 4 | 4 | 4 | 4 | 4 | 4 |
| | Slab hardness (Shore D) | 65 | 66 | 65 | 66 | 74 | 65 | 65 | 65 |
| | Cover formation | Inj. | Inj. | Inj. | Inj. | Inj. | Comp. | Comp. | Inj. |
| | Thickness (mm) | 1.0 | 1.0 | 1.0 | 1.0 | 1.0 | 0.5 | 0.4 | 1.8 |
| Property | Initial ball Speed (m/s) | 65.5 | 65.5 | 65.5 | 65.5 | 65.6 | 65.6 | 65.7 | 65.0 |
| | Spin rate (rpm) | 2920 | 2900 | 2910 | 2900 | 2860 | 2740 | 2710 | 3000 |
| | Flight distance (m) | 238.0 | 238.4 | 238.5 | 238.2 | 239.1 | 243.5 | 245.4 | 235.1 |
| | Abrasion-resistance | G | E | G | E | G | G | G | G |
| | Durability | 104 | 135 | 107 | 130 | 102 | 101 | 100 | 109 |

| | | | Golf ball No. | | | | |
|---|---|---|---|---|---|---|---|
| | | | 9 | 10 | 11 | 12 | 13 |
| Structure | | | 2P | 2P | 2P | 2P | 2P |
| Core | Diameter (mm) | | 40.7 | 37.2 | 40.7 | 40.7 | 40.7 |
| Cover | Thermoplastic polyurethane (A) | | — | — | — | — | — |
| | Elastollan ET858D | | — | — | 100 | — | — |
| | Elastollan ET864D | | 100 | 100 | — | — | 100 |
| | Elastollan 1174D | | — | — | — | — | — |
| | Elastollan HM76D | | — | — | — | 100 | — |
| | Polyisocyanate mixture (B) [NCO %] | | | | | | |
| | 1 [8.4] | | — | — | — | — | 5 |
| | 2 [10.0] | | — | 3 | 3 | 3 | — |
| | 3 [8.9] | | — | — | — | — | — |
| | Titanium oxide | | 4 | 4 | 4 | 4 | 4 |
| | Slab hardness (Shore D) | | 64 | 65 | 59 | 77 | 65 |
| | Cover formation | | Inj. | Inj. | Inj. | Inj. | Inj. |
| | Thickness (mm) | | 1.0 | 2.8 | 1.0 | 1.0 | 1.0 |
| Property | Initial ball Speed (m/s) | | 65.3 | 63.6 | 65.3 | 65.6 | 65.5 |
| | Spin rate (rpm) | | 2940 | 3300 | 3150 | 2840 | 2930 |
| | Flight distance (m) | | 237.2 | 223.3 | 233.9 | 238.6 | 237.7 |
| | Abrasion-resistance | | P | G | G | P | F |
| | Durability | | 80 | 110 | 108 | 85 | 93 |

Formulation: mass part,
"2P": 2 piece golf ball,
"Inj.": Injection molding,
"Comp.": Compression molding,
Notes on table 4
Elastollan ET858D: Thermoplastic polyurethane (Shore D hardness 58) available from BASF Japan Ltd
Elastollan ET864D: Thermoplastic polyurethane (Shore D hardness 64) available from BASF Japan Ltd
Elastollan 1174D: Thermoplastic polyurethane (Shore D hardness 74) available from BASF Japan Ltd
Elastollan HM76D: Thermoplastic polyurethane (Shore D hardness 76) available from BASF Japan Ltd The golf balls Nos. 1 to 8 were the case where the cover is made from a cover composition containing, as a resin component, a thermoplastic polyurethane (A) and a polyisocyanate mixture (B) in which a polyisocyanate (b-1) having at least three isocyanate groups is dispersed in a thermoplastic resin (b-2) which does not substantially react with an isocyanate group; and wherein the cover composition has a slab hardness of more than 60 and not more than 75 in Shore D hardness, and the cover has the thickness of 2.5 mm or less. With respect to these golf balls, the spin rate was low and the initial ball speed was high right after hitting the golf balls with the driver. Therefore, a long flight distance was achieved. Further, it was found that the golf balls were also excellent in abrasion resistance and durability. It was found that the golf ball No. 8 among these golf balls tended to have a slightly shorter flight distance since the cover was formed to be relatively thick.

The golf ball No. 9 was the case where a non-crosslinked thermoplastic polyurethane (A) was used as the cover material, and it was found that the golf ball was very poor in the abrasion resistance and durability. It was found that since the golf ball No. 10 had a cover thickness thicker than 2.5 mm, the repulsive property of the golf ball was poor and the flight distance was shortened. The golf balls Nos. 11 and 12 were the cases where the slab hardness of the cover compositions was out of the range of more than 60 and 75 or lower in Shore D hardness. It was found that with respect to the golf ball No. 11, since the slab hardness was lower than 60, the repulsive property of the golf ball was poor and the flight distance was shortened and with respect to the golf ball No. 12, since the slab hardness exceeded 75, the abrasion resistance and durability were poor. The golf ball No. 13 was the case where the thermoplastic polyurethane (A) of the cover was post-crosslinked by a low molecular weight diisocyanate and it was found that the abrasion resistance and durability were poor.

The present invention can be applied to a golf ball and more particularly is preferable for improving the abrasion resistance, durability and the long flight distance for a golf ball having a urethane cover.

This application is based on Japanese Patent application Nos. 2007-291263 filed on Nov. 8, 2007, the contents of which are hereby incorporated by reference.

What is claimed is:

1. A golf ball comprising a core and a cover covering the core,
wherein the cover is made from a cover composition containing, as a resin component,
a thermoplastic polyurethane (A) and
a polyisocyanate mixture (B) in which a polyisocyanate (b-1) having at least three isocyanate groups is dispersed in a thermoplastic resin (b-2) which does not substantially react with an isocyanate group; and
wherein the polyisocyanate (b-1) is an isocyanurate of a diisocyanate, the cover composition has a slab hardness of more than 60 and not more than 75 in Shore D hardness, and the cover has a thickness of 2.5 mm or less.

2. The golf ball according to claim 1, wherein the polyisocyanate mixture (B) has NCO content (NCO %) of 5.0 mass % to 30.0 mass %.

3. The golf ball according to claim 1, wherein the polyisocyanate (b-1) has NCO content (NCO %) of 1.5 mass % to 30.0 mass %.

4. The golf ball according to claim 1, wherein the thermoplastic resin (b-2) which does not substantially react with the isocyanate group is at least one kind selected from the group consisting of a polyester elastomer, an acrylic elastomer, a styrene elastomer, an olefin elastomer, and a vinyl chloride elastomer.

5. The golf ball according to claim 1, wherein the cover composition contains the polyisocyanate mixture (B) in an amount of 1 part by mass to 50 parts by mass relative to 100 parts by mass of the thermoplastic polyurethane (A).

6. The golf ball according to claim 1, wherein the polyisocyanate (b-1) and the thermoplastic resin (b-2) are blended in the polyisocyanate mixture (B) (a total of 100 mass %) in a ratio of the polyisocyanate (b-1)/thermoplastic resin (b-2)=5 mass % to 50 mass %/50 mass % to 95 mass %.

7. The golf ball according to claim 1, wherein the polyisocyanate (b-1) is an isocyanurate of isophorone diisocyanate, hexamethylene diisocyanate, or hydrogenated xylylene diisocyanate.

8. The golf ball according to claim 1, wherein the polyisocyanate mixture (B) contains an isocyanurate of isophorone diisocyanate as a polyisocyanate (b-1) and a polyester elastomer as the thermoplastic resin (b-2).

9. The golf ball according to claim 1, wherein the polyisocyanate mixture (B) contains an isocyanurate of hexamethylene diisocyanate as a polyisocyanate (b-1) and a polyester elastomer as the thermoplastic resin (b-2).

10. The golf ball according to claim 1, wherein the core has a surface hardness lager than the center hardness in Shore D hardness.

11. The golf ball according to claim 1, wherein the polyisocyanate mixture (B) has NCO content (NCO %) of 5.0 mass % to 30.0 mass %, and the polyisocyanate (b-1) has NCO content (NCO %) of 1.5 mass % to 30.0 mass %.

12. The golf ball according to claim 11, wherein the thermoplastic resin (b-2) which does not substantially react with the isocyanate group is at least one kind selected from the group consisting of a polyester elastomer, an acrylic elastomer, a styrene elastomer, an olefin elastomer, and a vinyl chloride elastomer.

13. The golf ball according to claim 12, wherein the cover composition contains the polyisocyanate mixture (B) in an amount of 1 part by mass to 50 parts by mass relative to 100 parts by mass of the thermoplastic polyurethane (A).

14. The golf ball according to claim 13, wherein the polyisocyanate (b-1) and the thermoplastic resin (b-2) are blended in the polyisocyanate mixture (B) (a total of 100 mass %) in a ratio of the polyisocyanate (b-1)/thermoplastic resin (b-2)= 5 mass % to 50 mass %/50 mass % to 95 mass %.

15. The golf ball according to claim 14, wherein the polyisocyanate (b-1) is an isocyanurate of isophorone diisocyanate, hexamethylene diisocyanate, or hydrogenated xylylene diisocyanate.

16. The golf ball according to claim 14, wherein the polyisocyanate mixture (B) contains an isocyanurate of isophorone diisocyanate as a polyisocyanate (b-1) and a polyester elastomer as the thermoplastic resin (b-2).

17. The golf ball according to claim 14, wherein the polyisocyanate mixture (B) contains an isocyanurate of hexamethylene diisocyanate as a polyisocyanate (b-1) and a polyester elastomer as the thermoplastic resin (b-2).

18. The golf ball according to claim 15, wherein the core has a surface hardness larger than the center hardness in Shore D hardness.

* * * * *